(12) United States Patent
Chung et al.

(10) Patent No.: US 11,801,587 B2
(45) Date of Patent: Oct. 31, 2023

(54) ELECTRIC COMMUTATING RATCHET TOOL

(71) Applicant: TECHWAY INDUSTRIAL CO., LTD., Taichung (TW)

(72) Inventors: Fu-Hsiang Chung, Taichung (TW); Hong Fang Chen, Taichung (TW); Shih-Wei Hung, Taichung (TW)

(73) Assignee: TECHWAY INDUSTRIAL CO., LTD., Taichung (TW)

( * ) Notice: Subject to any disclaimer, the term of this patent is extended or adjusted under 35 U.S.C. 154(b) by 492 days.

(21) Appl. No.: 17/177,919

(22) Filed: Feb. 17, 2021

(65) Prior Publication Data
US 2022/0258311 A1 Aug. 18, 2022

(51) Int. Cl.
| | |
|---|---|
| *B25B 21/00* | (2006.01) |
| *H02K 33/06* | (2006.01) |
| *H02K 7/12* | (2006.01) |
| *H02K 33/16* | (2006.01) |
| *H02K 7/14* | (2006.01) |

(52) U.S. Cl.
CPC .......... *B25B 21/004* (2013.01); *H02K 7/145* (2013.01); *H02K 33/16* (2013.01); *B25B 21/002* (2013.01)

(58) Field of Classification Search
CPC ...... B25B 21/00; B25B 21/004; H02K 7/145; H02K 33/16
See application file for complete search history.

(56) References Cited

U.S. PATENT DOCUMENTS

2014/0102260 A1* 4/2014 Pusateri .................. F16H 31/00
173/1

* cited by examiner

*Primary Examiner* — David B. Thomas
(74) *Attorney, Agent, or Firm* — GUICE PATENTS PLLC

(57) ABSTRACT

The invention is an electric commutating ratchet tool comprising: a head; a ratchet mechanism with a rotating member and a latch member; the rotating member is capable of rotating, the latch member is capable of displacing and controlling rotation direction of the rotating member; and a commutating device with a commutating member, a magnetic driving member and a magnetic actuating unit; the commutating member is capable of displacing to abut against the latch member; the magnetic actuating unit is opposite to the magnetic driving member, either the magnetic actuating unit or the magnetic driving member is disposed on the commutating member; the magnetic actuating unit is at least one electromagnet; magnetic direction is changed through each of the electromagnets, so that the magnetic driving member is magnetically driven to change a position of the latch member.

15 Claims, 9 Drawing Sheets

ELECTRIC COMMUTATING RATCHET TOOL

BACKGROUND OF THE INVENTION

Field of Invention

The invention relates to a hand-held tool, and more particularly to an electric commutating ratchet tool that is capable of commutating through changes in a magnetic field of an electromagnet.

Related Art

Ratchet wrench is a commonly used hand-held tool. In order to be able to apply force to operate at a narrow angle, a ratchet structure is used inside the ratchet wrench. As shown in FIG. 1, the ratchet rotates in a single direction when it is used, and is locked and fixed in another direction, and when rotating toward the locking direction, force can be applied to the locking direction. The conventional commutating ratchet wrench is mainly operated to change the direction of force application of the wrench by changing the direction of rotation of the ratchet. A ratchet structure 10 of the commutating ratchet wrench includes a ratchet 11, a detent gear 12, and a commutating button 13, the ratchet 11 is provided with detent teeth around a circumference, the detent gear 12 can be correspondingly meshed with an outer surface of the ratchet 11, and through different directions of meshing, the ratchet 11 can apply force in different directions. The commutating button 13 elastically abuts against the detent gear 12 and can drive the detent gear 12 to switch direction, and commutating action is performed through the commutating button 13.

The conventional ratchet structure, whether it is provided in a manual ratchet wrench or an electric ratchet wrench, requires the operator to switch a position of the detent gear 12 by turning the commutating button 13 in different directions by hand, so that the rotation direction of the ratchet 11 can be changed.

However, during the switching process, the operator needs both hands to operate—that is, holding the ratchet wrench with one hand, and operating the commutating button 13 with another hand to perform commutating action; if the ratchet wrench is used in a work area that is relatively narrow or difficult to reach inside, and the ratchet wrench is taken out to switch direction and then placed back in the work area, it will take a considerable amount of time and cause inconvenience in operation. Furthermore, because the commutating button 13 needs to be switched by hand in order to be able to perform commutating action, structure of the commutating button 13 will be partially exposed, which is prone to intrusion of foreign matter or dust after long-term use, resulting in abrasion of the internal structure. In addition, in order to facilitate the operation, the commutating button 13 has a certain height, which causes the height of the head of the tool to increase relatively, and limitation in the usage of the ratchet wrench.

SUMMARY OF THE INVENTION

A main object of the invention is to provide an electric commutating ratchet tool that is capable of commutating through changes in a magnetic field of an electromagnet.

In order to achieve the above object, the invention provides an electric commutating ratchet tool comprising:
a head;
a ratchet mechanism disposed in the head and having a rotating member and a latch member, the rotating member rotating on a central axis; the latch member being capable of displacing, and the latch member unidirectionally meshing with the rotating member so that the rotating member rotating unidirectionally; and
a commutating device disposed in the head and having a commutating member, a magnetic driving member and a magnetic actuating unit; the commutating member having an abutting portion, the abutting portion being capable of movably abutting against the latch member; the magnetic actuating unit being opposite to the magnetic driving member; either the magnetic actuating unit or the magnetic driving member being disposed on the commutating member, and the other being disposed oppositely to the commutating member; the magnetic actuating unit being at least one electromagnet; each of the electromagnets being capable of changing magnetism so that the magnetic actuating member and the magnetic driving member being magnetically driven to change a position of the latch member, and the latch member being capable of correspondingly changing a direction of force application of the rotating member.

Preferably, the magnetic driving member is a permanent magnet; each of the electromagnets of the magnetic actuating unit comprises at least one coil and an iron core, the coil is wound on the iron core.

Preferably, a relative position of the permanent magnet and the magnetic actuating unit has a single polarity, and the iron core of the electromagnet has two dissimilar polarities.

Preferably, the permanent magnet has at least two dissimilar polarities, the electromagnet has at least three magnetic poles, and the magnetic poles of two adjacent positions are opposite.

Preferably, the magnetic driving member is a material that can be magnetically attracted, the magnetic actuating unit has two electromagnets disposed at intervals; and the two electromagnets are capable of respectively conducting magnetism and magnetically attracting the magnetic driving member.

The electric commutating ratchet tool provided by the invention changes the magnetic state through the electromagnets of the magnetic actuating unit to change a position of the commutating member abutting against the latch member, so that the latch member is capable of changing a meshing position to change a direction of rotation of the rotating member.

BRIEF DESCRIPTION OF THE DRAWINGS

In order to enable the examiner to further understand the objects, features, and achieved efficacies of the invention, six preferred embodiments are listed below for detailed explanation in conjunction with the drawings, in which.

DETAILED DESCRIPTION OF THE INVENTION

Figure 1:
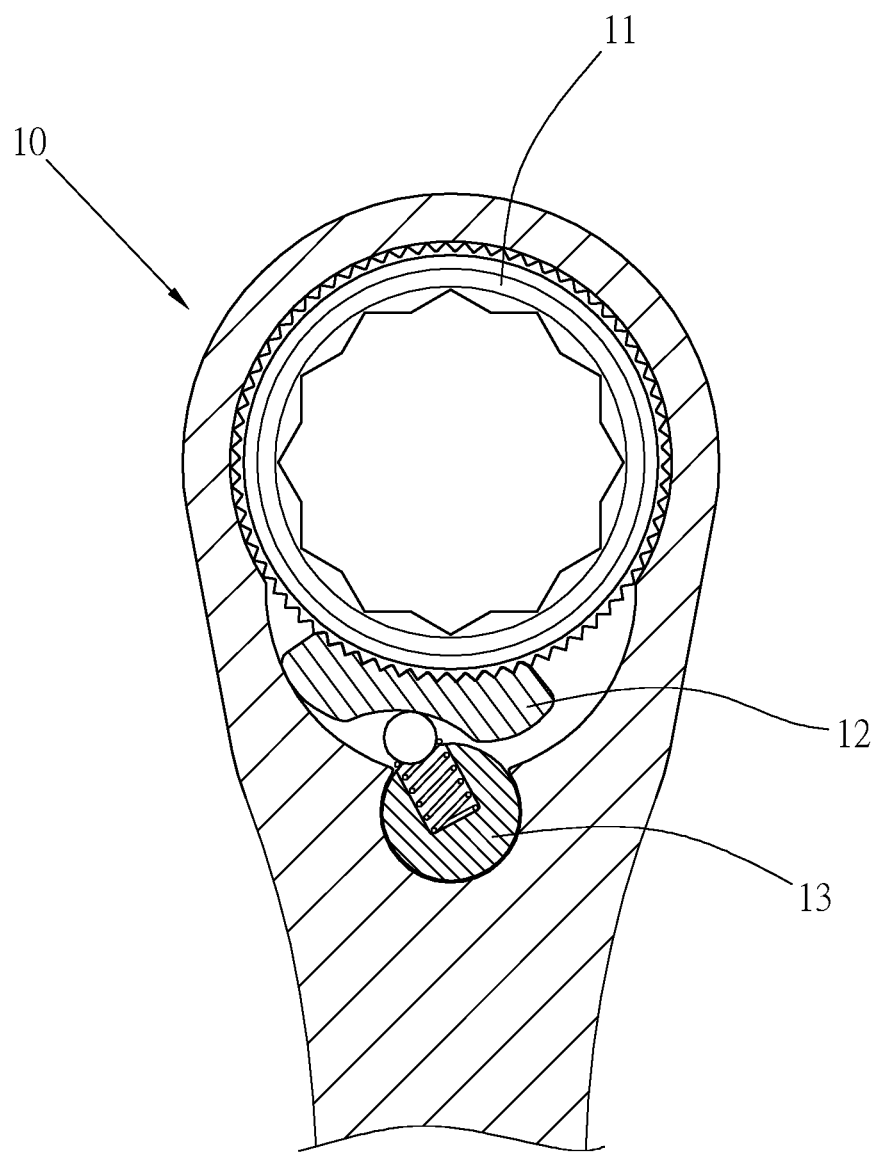
FIG. 1 is a cross-sectional view of a conventional commutating structure of a ratchet wrench.
Figure 2:
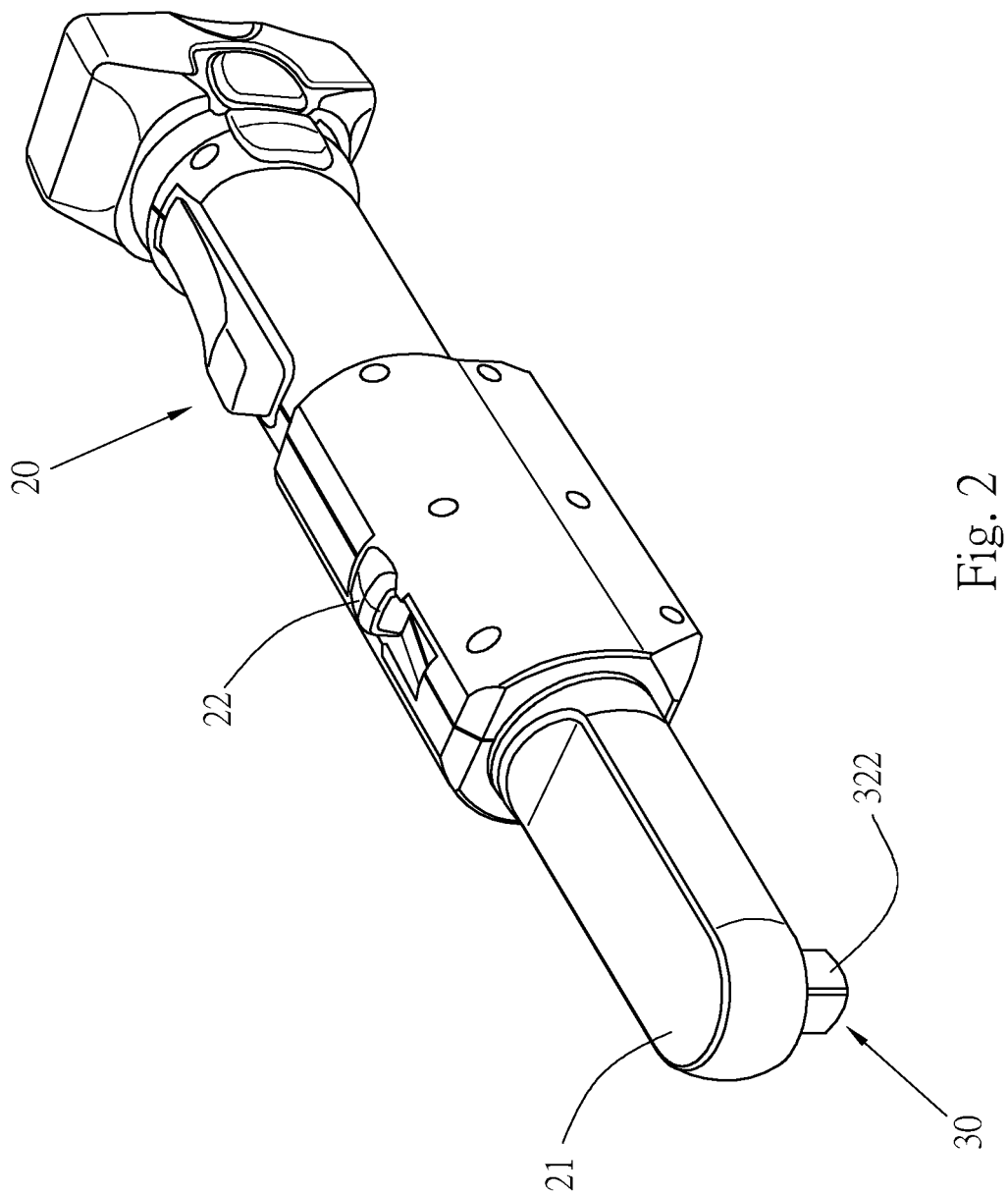
FIG. 2 is a perspective view of a ratchet tool according to a preferred embodiment of the invention.
Figure 3:
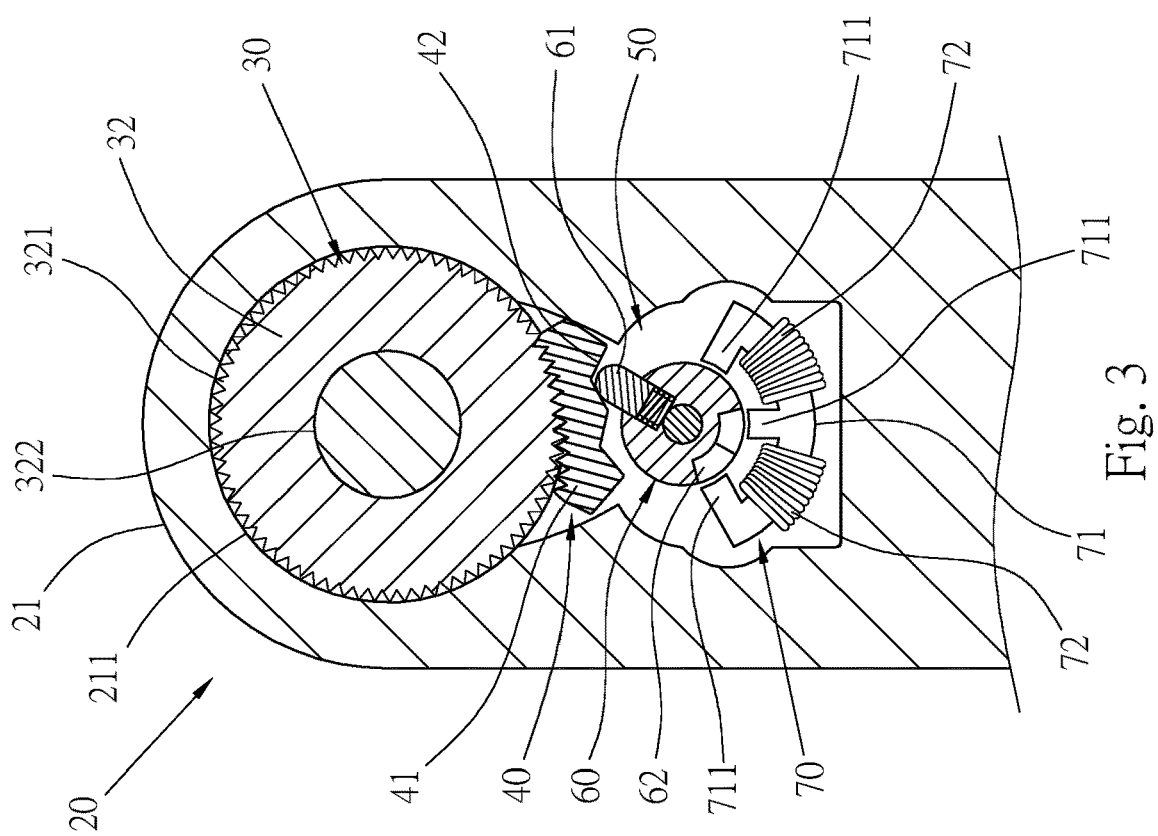
FIG. 3 is a partial cross-sectional view of the ratchet tool of FIG. 1.

Please refer to FIGS. 2 to 3, a ratchet tool 20 provided by a preferred embodiment of the invention has a head 21, inside the head 21 is provided with a rotatable ratchet mechanism and a commutating device 50 to control a direction of rotation of the ratchet mechanism. The electric commutating ratchet tool provided by the invention can be an electric ratchet wrench or a manual (non-powered) ratchet wrench. The electric ratchet wrench or the manual ratchet wrench has electric energy; for example, the wrench is equipped with batteries and is provided with electric energy by the batteries, and can provide electric energy to the electric commutating device 50 through an operation action, such as pressing a button. The ratchet tool 20 shown in FIG. 2 is a ratchet wrench with a body provided with a commutating button 22. Pressing the commutating button 22 is capable of activating the commutating device 50 with electric energy. The commutating button 22 can be disposed away from the ratchet mechanism, that is, close to a user's hand holding position, the user can hold the ratchet tool 20 with one hand and press the commutating button 22 to switch direction and change a rotation direction of the ratchet mechanism. Other structures of the ratchet wrench are not the subject matters of the invention, so they will not be described. Front, rear, left and right directions, clockwise and counterclockwise rotation directions described in this specification are based on the orientations of the diagrams, but they are not limited thereto.

A chamber 211 is provided inside the head 21.

The ratchet mechanism is installed in the chamber 211, and has a rotating member 30 and a latch member 40;

the rotating member 30 in this embodiment is a ratchet 32 that rotates along a central axis, the ratchet 32 is pivotally disposed in the chamber 211, an outer periphery of the ratchet 32 is circumferentially provided with a ratchet teeth portion 321, a work portion 322 is provided at a position of the central axis, such as a convex column or a polygonal hole for joining with a workpiece or a socket;

a front end of the latch member 40 is provided with a latch teeth portion 41 meshing with the ratchet teeth portion 321, and a rear end of the latch member 40 is provided with a commutating portion 42;

a commutating device 50 is disposed in the chamber 211 of the head 21, and has a commutating member 60 and a magnetic actuating unit 70, the commutating member 60 is pivotally disposed in the chamber 211 and capable of generating rotation; the commutating member 60 has an elastic abutting portion 61 at a front end and a magnetic driving member 62 at a rear end; the abutting portion 61 is capable of elastically abutting against the commutating portion 42 of the latch member 40, a position of the abutting portion 61 can be changed when the commutating member 60 rotates, so that the abutting portion 61 is capable of elastically abutting against the commutating portion 42 at different positions, and the latch teeth portion 41 of the latch member 40 is capable of meshing with the ratchet teeth portion 321 of the ratchet 32 in different directions; the magnetic driving member 62 is a permanent magnet, and is disposed on an outer peripheral surface of the commutating member 60 and has a top side with an N pole and an S pole, so that the magnetic driving member 62 is capable of generating a maximum magnetic attraction (magnetic flux); the magnetic actuating unit 70 is disposed opposite to the magnetic driving member 62, and the magnetic actuating unit 70 is fixed at a rear side of the commutating member 60; the magnetic actuating unit 70 is an electromagnet and has an iron core 71 and two coils 72; the two coils 72 are wound adjacently on the iron core 71, and are respectively connected to a battery of the wrench, after pressing the commutating button 22 to conduct electricity, the two coils 72 have opposite magnetic pole directions, the iron core 71 is protrudingly provided with a magnetic pole portion 711 on two sides and at a center of the two coils 72 respectively, the magnetic pole portions 711 are disposed at positions close to the magnetic driving member 62, when the two coils 72 are conducted, the magnetic pole portions 711 on the two sides have a same polarity, and a polarity of the central magnetic pole portion 711 is opposite to that of the magnetic pole portions 711 on the two sides.

Figure 4:
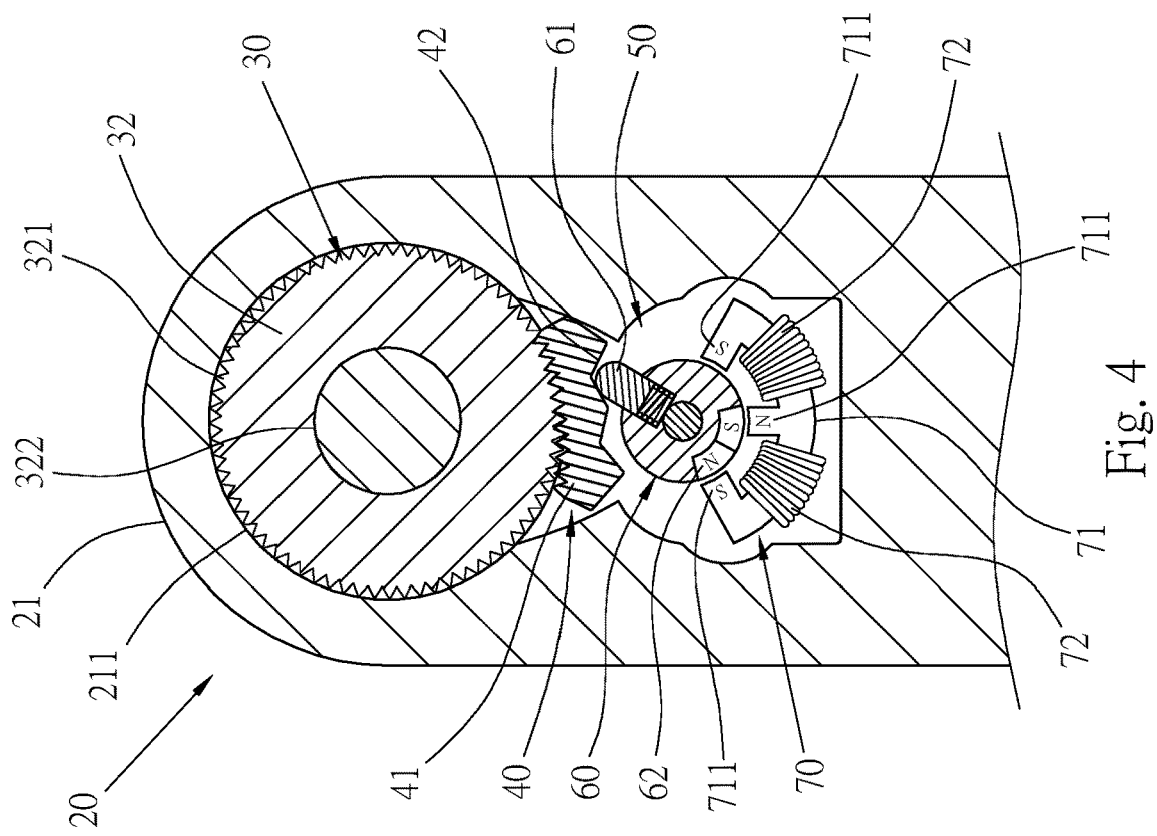
FIG. 4 is a schematic diagram of magnetic attraction action of the ratchet tool in a first direction.
Figure 5:
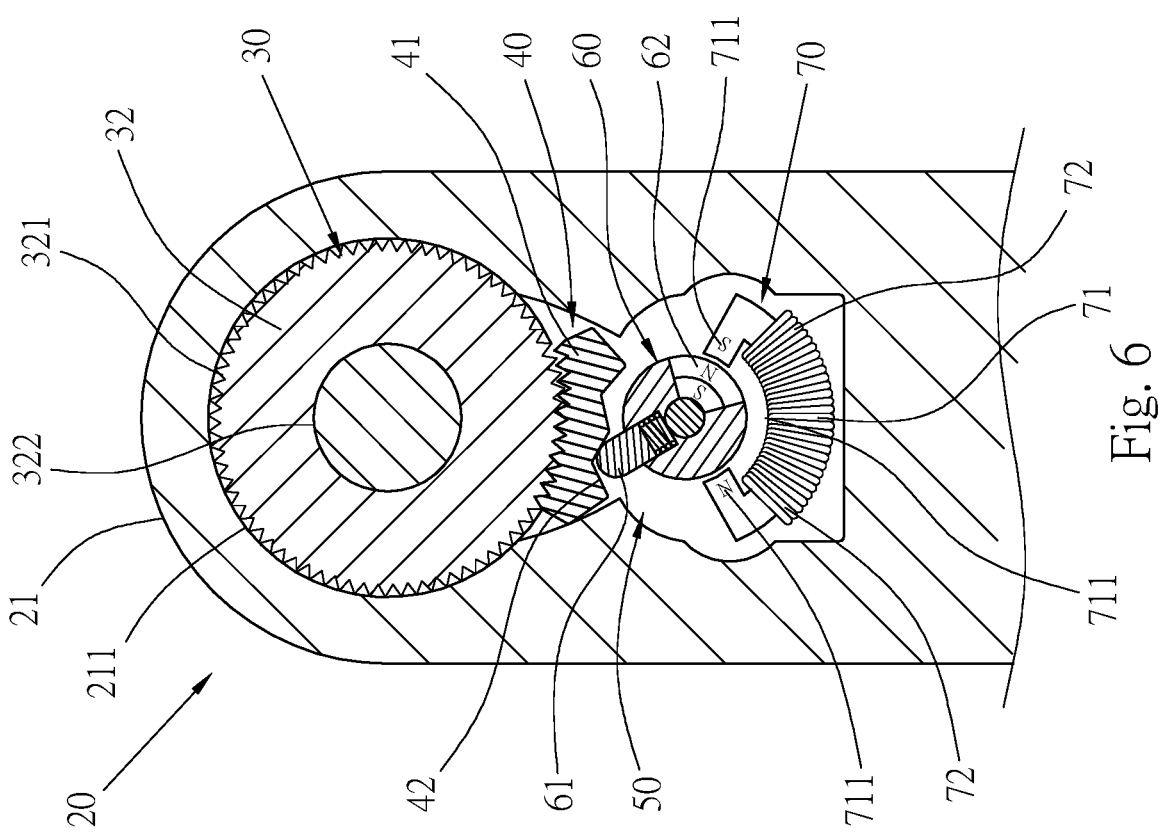
FIG. 5 is a schematic diagram of magnetic attraction action of the ratchet tool in a second direction.

When in use, the ratchet tool 20 rotates and applies force to a workpiece or a socket (not shown in the figures) through the work portion 322 of the ratchet 32, and a unidirectional rotation direction of the ratchet 32 is changed through a position of the latch member 40. When being used, press the commutating button 22 to energize the coils 72, as shown in FIG. 4, when in a first position initially, excitation of the two coils 72 causes the magnetic pole portions 711 at the left and right sides of the magnetic actuating unit 70 to be S poles, and the magnetic pole portion 711 located at the center between the two coils 72 to be an N pole. In an excited state, the N pole of the magnetic driving member 62 is attracted by the S pole of the left magnetic pole portion 711, and the S pole of the magnetic driving member 62 is attracted by the N pole of the central magnetic pole portion 711, and the commutating member 60 is driven to rotate clockwise by attraction and repulsion of magnetism, so that the abutting portion 61 will move to the right to elastically abut against the right side of the commutating portion 42 and to push the latch member 40 to displace to the right, and the latch teeth portion 41 of a right half of the latch member 40 will mesh with the ratchet teeth portion 321 of the ratchet 32. Please refer to FIG. 5, when performing commutating action, press the commutating button 22 to enable it to commutate an excitation current supplied to the two coils 72, and magnetism of the two coils 72 will therefore be commutated, causing the magnetic pole portions 711 on the left and right sides to be converted to N poles, and the magnetic pole portion 711 at the center position becomes S pole. Because the left magnetic pole portion 711 originally magnetically attracted to the N pole of the magnetic driving member 62 is converted from S pole to N pole, and the central magnetic pole portion 711 originally magnetically attracted to the S pole of the magnetic driving member 62 is converted from N pole to S pole, the magnetic driving member 62 will magnetically repel the magnetic actuating unit 70 at the original position. As a result, the commutating member 60 will rotate in a counterclockwise direction, so that the N pole of the magnetic driving member 62 is magnetically attracted by the S pole of the magnetic pole portion 711 at the center of the iron core 71 of the magnetic actuating unit 70, and the S pole of the magnetic driving member 62 is magnetically attracted by the N pole of the magnetic pole portion 711 at the right side of the iron core 71 of the magnetic actuating unit 70. The commutating member 60 will rotate in a counterclockwise direction as a whole, so that the abutting portion 61 will move to the left to elastically abut against the left side of the commutating portion 42, and the latch teeth portion 41 of a left half of the latch member 40 will mesh with the ratchet teeth portion 321 of the ratchet 32, so that the ratchet 32 is capable of changing a direction of force application.

When performing commutating action again, press the commutating button 22 to change a direction of the excitation current again, so that the coils 72 of the magnetic actuating unit 70 produce different magnetic directions, and the magnetic driving member 62 will rotate in an opposite direction again due to repulsion of same magnetic poles and attraction of opposite magnetic poles, the commutating member 60 rotates clockwise, and the abutting portion 61 also rotates in a clockwise direction. As a result, the abutting portion 61 changes direction and elastically abuts against the right side of the commutating portion 42 of the latch member 40, and the latch teeth portion 41 of a right half of the latch member 40 will mesh with the ratchet teeth portion 321 of the ratchet 32, thereby changing a rotation direction of the ratchet 32.

Since positions of the magnetic pole portions 711 of the iron core 71 of the magnetic actuating unit 70 are fixed, a position at which the magnetic driving member 62 of the commutating member 60 being magnetically attracted is also fixed, so that a rotation angle of the commutating member 60 is fixed, and an angle at which the latch member 40 meshes with the ratchet 32 is fixed each time, thereby commutating action can be performed reliably.

Figure 6:
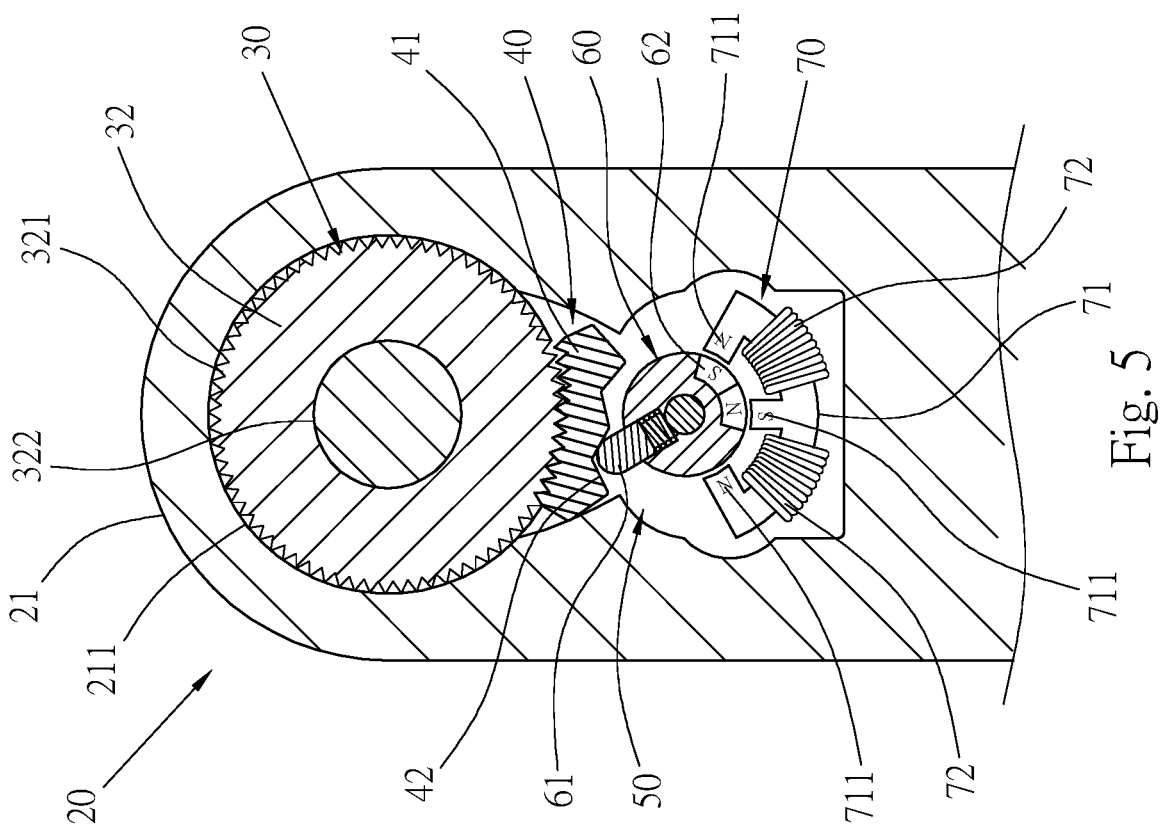
FIG. 6 is a partial cross-sectional view of the ratchet tool according to a second preferred embodiment of the invention.
Figure 7:
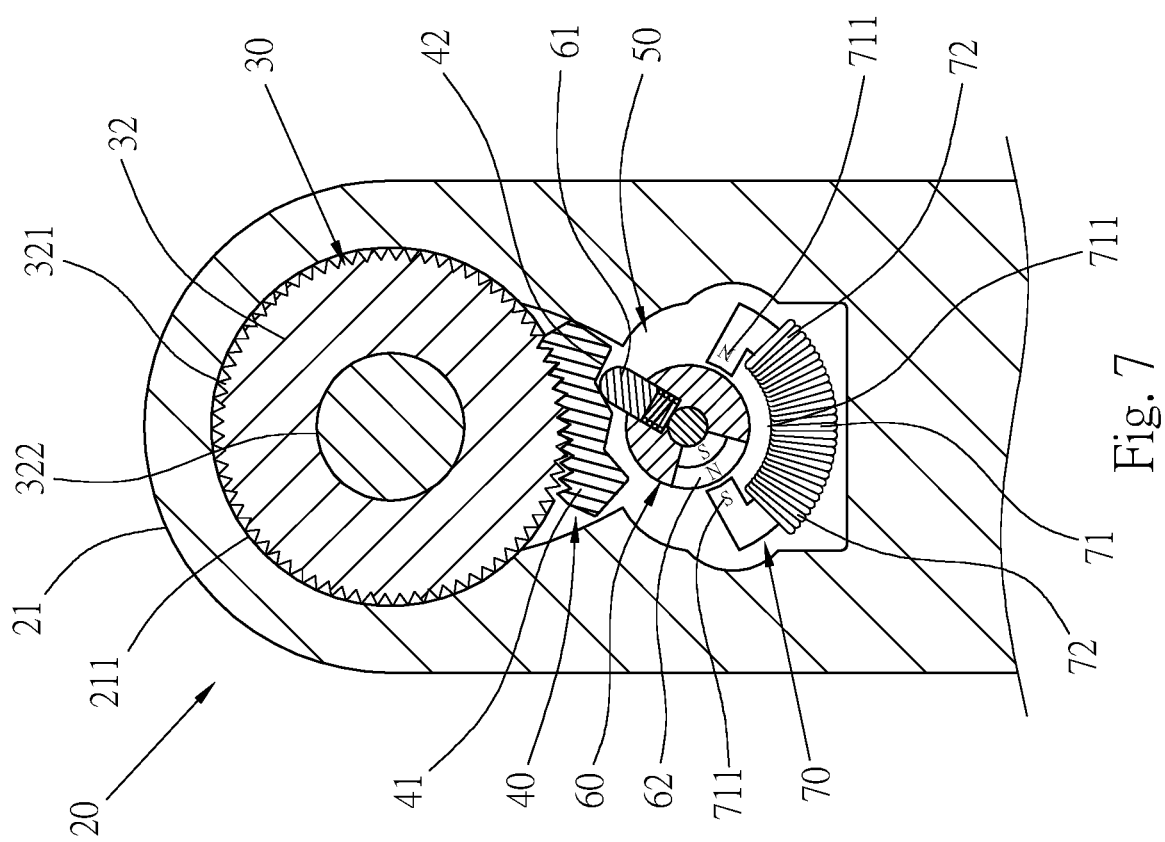
FIG. 7 is a schematic diagram of magnetic attraction action of the ratchet tool of the second preferred embodiment of the invention in another direction.

Please refer to FIGS. 6 and 7 for a second preferred embodiment of the ratchet tool 20 provided by the invention. The main structure of the ratchet tool 20 is the same as that of the first preferred embodiment, and the same components use the same reference numerals, which will not be described again, wherein:

the magnetic driving member 62 has only a single magnetic pole at a surface position of the commutating member 60, for example, in this embodiment, the N pole faces an outer side, which is a position with the strongest magnetic attraction (magnetic flux), the iron core 71 of the magnetic actuating unit 70 only has one coil 72, and two ends of the iron core 71 are respectively provided with the magnetic pole portion 711, through attraction or repulsion of a single magnetic pole, the commutating member 60 is also capable of commutating.

Figure 8:
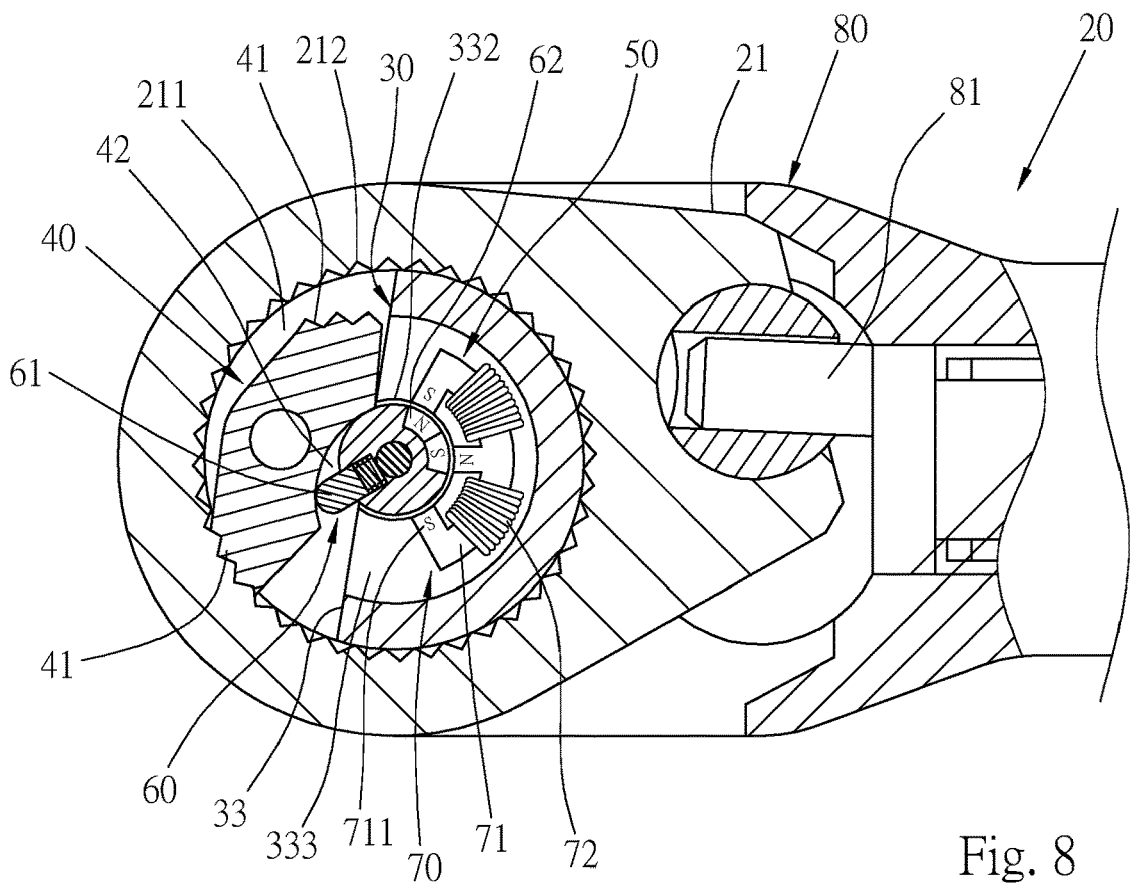
FIG. 8 is a partial cross-sectional view of the ratchet tool according to a third preferred embodiment of the invention.
Figure 9:
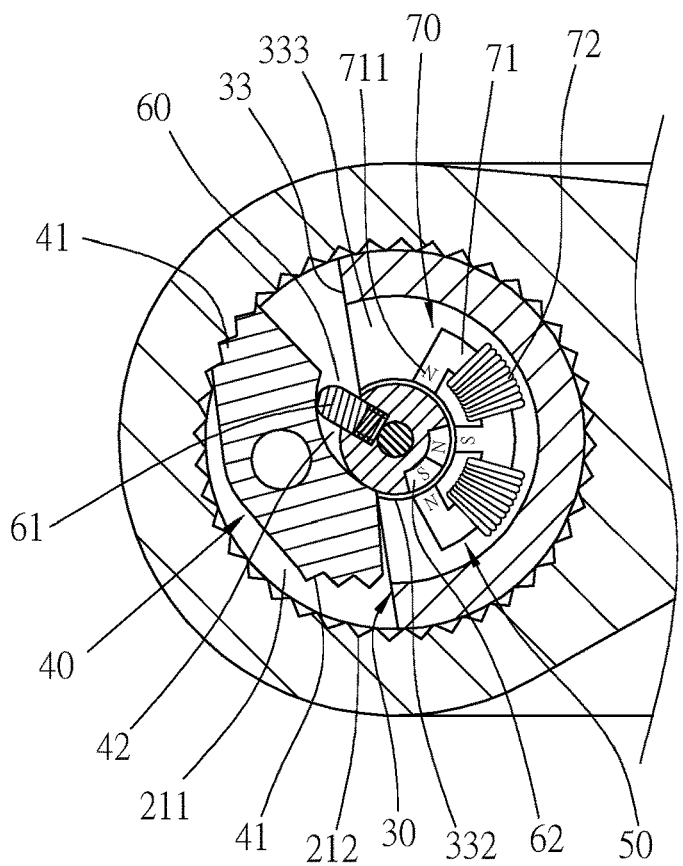
FIG. 9 is a schematic view of the ratchet tool of the third preferred embodiment of the invention rotating in a direction opposite to that of FIG. 8.

Please refer to FIGS. 8 and 9 for a third preferred embodiment of the ratchet tool 20 provided by the invention. The main structure of the ratchet tool 20 is the same as that of the first preferred embodiment, and the same components use the same reference numerals, which will not be described again, wherein:

the chamber 211 of the head 21 is circumferentially provided with a ratchet teeth portion 212, the rotating member 30 being a work head 33 is pivotally disposed in the chamber 211, the work head 33 is provided with a work portion capable of connecting with a workpiece or a socket (not shown in the figures), a front side of the work head 33 is respectively recessed with an embedding groove 332 and an arc groove 333, the latch member 40 is pivotally disposed in the chamber 211 and capable of rotating, the latch teeth portion 41 of the latch member 40 is capable of meshing with the ratchet teeth portion 212 around the chamber 211; the commutating member 60 and the magnetic actuating unit 70 of the commutating device 50 are respectively disposed in the embedding groove 332 and the arc groove 333, the commutating member 60 is capable of rotating in the embedding groove 332, after the coils 72 of the magnetic actuating unit 70 are energized by the battery, magnetic direction changes, so that the commutating member 60 is capable of rotating and changing direction, thereby the latch member 40 can be driven to produce meshing effect in different directions, in addition, the head 21 is pivotally disposed on a frame 80, and driven by deflection of a power eccentric device 81, the power eccentric device 81 can be driven by electric power or fluid pressure as a power source, but it is not limited thereto, so that the head 21 is capable of swinging at small angle on the frame 80, through continuous deflection and driving of the power eccentric device 81, the head 21 can be continuously driven to swing at small angle leftward and rightward on the frame 80, so that the rotating member 30 pivotally disposed in the head 21 is capable of performing small-angle rotation to apply force, when the commutating member 60 rotates, the latch member 40 is driven to shift leftward or rightward, so that the latch member 40 meshes with the ratchet teeth portion 212 of the chamber 211 by the latch teeth portion 41 on the left or right side to control rotation direction of the work head 33.

Figure 10:
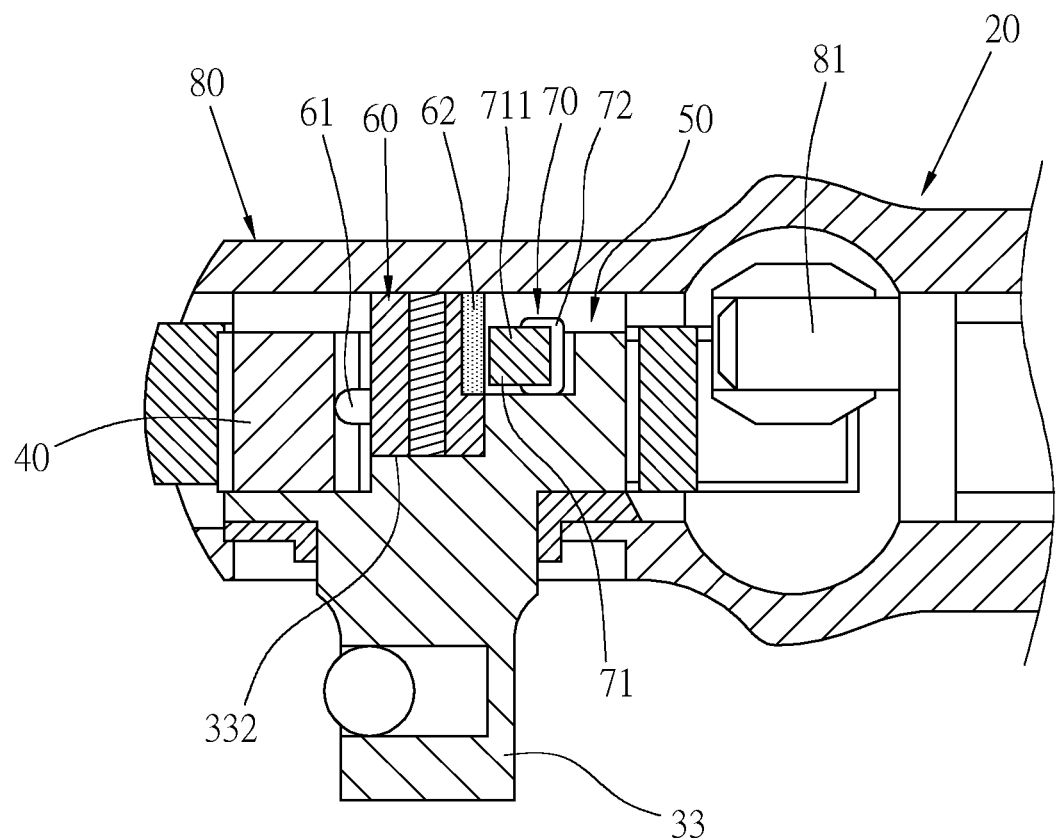
FIG. 10 is a side cross-sectional view of the ratchet tool according to a fourth preferred embodiment of the invention.

Please refer to FIG. 10 for a fourth preferred embodiment of the ratchet tool 20 provided by the invention. The main structure of the ratchet tool 20 is the same as that of the third preferred embodiment, and the same components use the same reference numerals, which will not be described again, wherein:

the magnetic actuating unit 70 is fixed on the work head 33, and the commutating member 60 is slightly protruding from the embedding groove 332, so that the magnetic driving member 62 is located above the work head 33 and capable of interacting with the magnetic actuating unit 70; and the magnetic actuating unit 70 can be easily installed and its magnetic attraction position can be adjusted.

Figure 12:
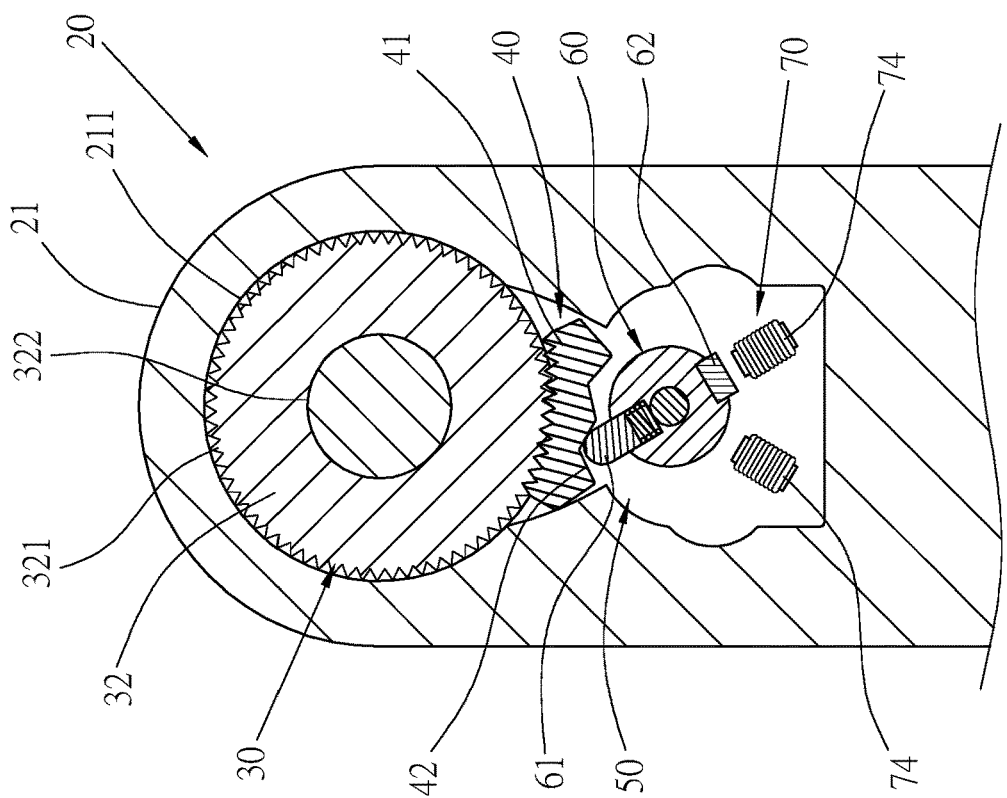
FIG. 12 is a schematic diagram of magnetic attraction action of the ratchet tool of the fifth preferred embodiment of the invention in a second direction.
Figure 11:
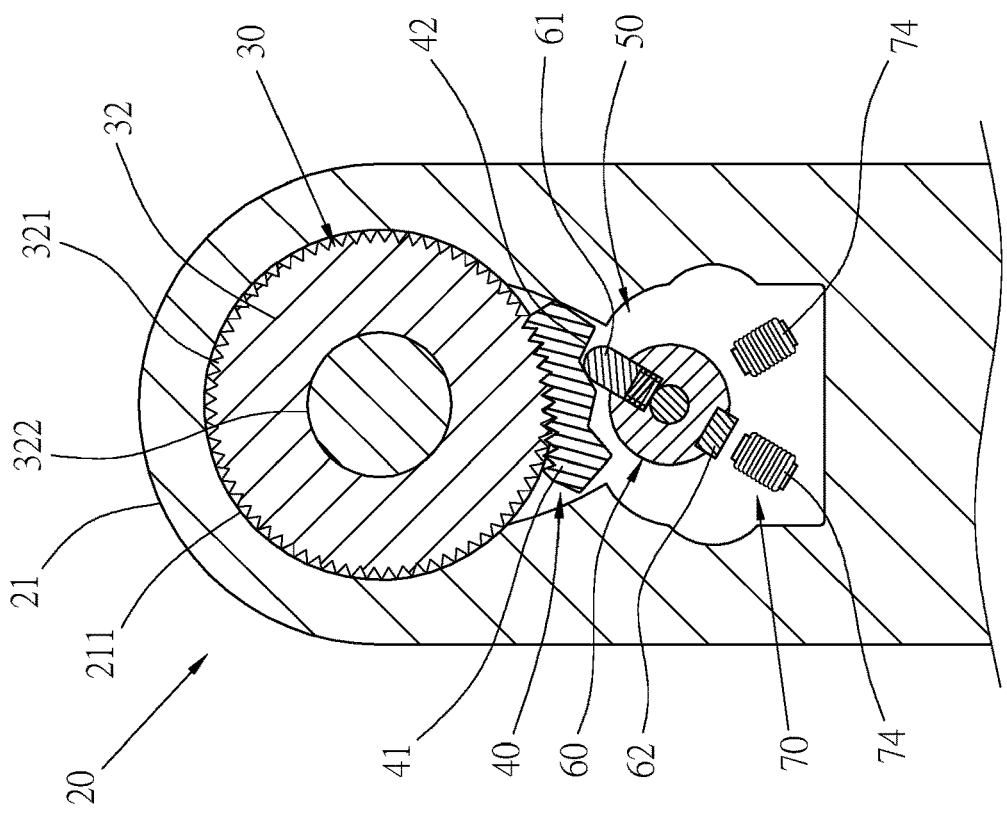
FIG. 11 is a schematic diagram of magnetic attraction action of the ratchet tool of a fifth preferred embodiment of the invention in a first direction.

Please refer to FIGS. 11 and 12 for a fifth preferred embodiment of the ratchet tool 20 provided by the invention. The main structure of the ratchet tool 20 is the same as that of the first preferred embodiment, and the same components use the same reference numerals, which will not be described again, wherein:

the magnetic driving member 62 is composed of a metal that can be magnetically attracted, such as iron or its alloys; the magnetic actuating unit 70 is composed of two electromagnets 74, a spacing is between the two electromagnets 74, the two electromagnets 74 can be activated separately to generate magnetic attraction force so that the magnetic driving member 62 can be magnetically attracted by one of the electromagnets 74, when the magnetic driving member 62 approaches the electromagnet 74 with magnetic attraction, the abutting portion 61 of the commutating member 60 can be driven to perform a commutating action simultaneously, when switching to the other electromagnet 74 to conduct magnetism, the magnetic driving member 62 can be driven to move in another direction, thereby switching a direction of the commutating member 60.

Figure 13:
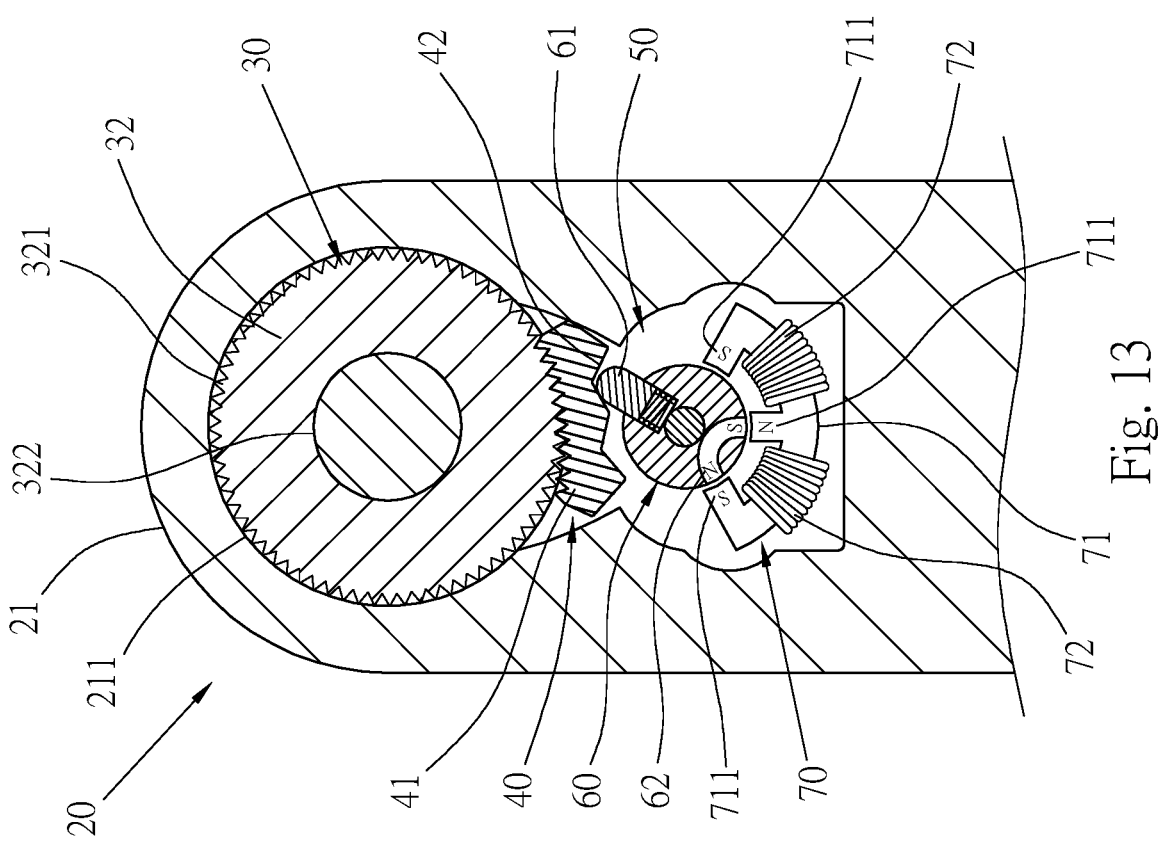
FIG. 13 is a cross-sectional view of the ratchet tool according to a sixth preferred embodiment of the invention.

Please refer to FIG. 13 for a sixth preferred embodiment of the ratchet tool 20 provided by the invention. The main structure of the ratchet tool 20 is the same as that of the first preferred embodiment, and the same components use the same reference numerals, which will not be described again, wherein:

the magnetic driving member 62 is a U-shaped permanent magnet, N pole and S pole ends thereof, that is, positions where magnetic attraction (magnetic flux) is the maximum, are disposed on an outer end surface of the commutating member 60, so that the magnetic driving member 62 produces a better magnetic attraction effect.

The electric commutating ratchet tool provided by the invention aims to change a position of the commutating member through positional changes generated by magnetic drive between the magnetic driving member and the magnetic actuating unit, thereby adjusting a rotation direction of the ratchet mechanism. Compared with the prior art requiring to adjust direction by holding with one hand and switching the commutating button with another hand, the commutating member of the invention is capable of directly performing commutating action by manipulating magnetic changes of electromagnetism, and isolating the mechanism inside the chamber from the outside to keep the interior clean. Moreover, there is no need to remove the head from an operating position when changing directions, which can reduce the time for commutating. Furthermore, the position of switching directions can be set close to the position held by hand, and can be directly held and perform action of switching directions with one hand.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. An electric commutating ratchet tool comprising:
   a head;
   a ratchet mechanism disposed in the head and having a rotating member and a latch member, the rotating member rotating on a central axis; the latch member being capable of displacing, and the latch member unidirectionally meshing with the rotating member so that the rotating member rotating unidirectionally; and
   a commutating device disposed in the head and having a commutating member, a magnetic driving member and a magnetic actuating unit;
   the commutating member being capable of displacing, an abutting portion being disposed on the commutating member, and the abutting portion abutting against the latch member;
   the magnetic actuating unit being opposite to the magnetic driving member, either the magnetic actuating unit or the magnetic driving member being disposed on the commutating member, and the other being disposed oppositely to the commutating member; the magnetic actuating unit being at least one electromagnet, the magnetic driving member being capable of magnetically driven by the magnetic actuating unit; the magnetic actuating unit being capable of changing magnetic position and generating a magnetically driven displacement change with the magnetic driving member to change a rotation direction of the rotating member.

2. The ratchet tool as claimed in claim 1, wherein the magnetic driving member is a permanent magnet; the electromagnet of the magnetic actuating unit comprises at least one coil and an iron core, and the coil is wound on the iron core.

3. The ratchet tool as claimed in claim 2, wherein the iron core is protrudingly provided with a magnetic pole portion on two sides of the coil respectively, and the magnetic pole portions are disposed close to a side of the permanent magnet.

4. The ratchet tool as claimed in claim 2, wherein the permanent magnet of the magnetic driving member has a single polarity, and the electromagnet of the magnetic actuating unit has two dissimilar polarities.

5. The ratchet tool as claimed in claim 4, wherein a single polarity of the permanent magnet of the magnetic driving member faces toward the magnetic actuating unit.

6. The ratchet tool as claimed in claim 2, wherein the permanent magnet has at least two dissimilar polarities, the electromagnet has at least three magnetic poles, and two adjacent magnetic poles have dissimilar polarities.

7. The ratchet tool as claimed in claim 6, wherein the two dissimilar polarities of the permanent magnet of the magnetic driving member face toward the magnetic actuating unit.

8. The ratchet tool as claimed in claim 1, wherein the magnetic driving member is a material that can be magnetically attracted, the magnetic actuating unit has two electromagnets disposed at intervals; and the two electromagnets are capable of respectively conducting magnetism and magnetically attracting the magnetic driving member.

9. The ratchet tool as claimed in claim 1, wherein the rotating member is a ratchet, an outer periphery of the ratchet is circumferentially provided with a ratchet teeth portion, a center of the ratchet is provided with a work portion; a side of the latch member opposite to the ratchet teeth portion is provided with at least one latch teeth portion capable of meshing with the ratchet teeth portion; and the latch member is disposed between the rotating member and the commutating device.

10. The ratchet tool as claimed in claim 1, wherein the head has a chamber, and the ratchet mechanism and the commutating device are disposed in the chamber.

11. The ratchet tool as claimed in claim 1, wherein the head is connected with a power eccentric device, and the power eccentric device is capable of driving the head to swing.

12. An electric commutating ratchet tool comprising:
    a head provided with a chamber, and a side wall of the chamber being circumferentially provided with a ratchet teeth portion;
    a ratchet mechanism disposed in the head and having a rotating member and a latch member, the rotating member rotating on a central axis, the rotating member being a work head disposed in the chamber, a work portion being disposed on the work head; the latch member being pivotally disposed in the chamber, a side of the latch member facing toward the ratchet teeth portion being provided with at least one latch teeth portion capable of meshing with the ratchet teeth portion; and the latch member unidirectionally meshing with the rotating member so that the rotating member rotating unidirectionally; and a commutating device disposed in the rotating member and having a commutating member, a magnetic driving member and a magnetic actuating unit;

the commutating member being capable of displacing in the rotating member, an abutting portion being disposed on the commutating member, and the abutting portion abutting against the latch member;

the magnetic actuating unit being opposite to the magnetic driving member, either the magnetic actuating unit or the magnetic driving member being disposed on the commutating member, and the other being disposed oppositely to the commutating member; the magnetic actuating unit being at least one electromagnet, the magnetic driving member being capable of magnetically driven by the magnetic actuating unit; the magnetic actuating unit being capable of changing magnetic position and generating a magnetically driven displacement change with the magnetic driving member to change a rotation direction of the rotating member.

13. The ratchet tool as claimed in claim 12, wherein the work head is recessed with an embedding groove at a side close to the latch, so that the commutating member can be pivotally disposed in the embedding groove, the abutting portion faces the latch member, the magnetic driving member faces the work head; the magnetic actuating unit is fixed on the work head and opposite to the magnetic driving member.

14. The ratchet tool as claimed in claim 13, wherein the work head is recessed with an arc groove, the arc groove is close to a circumferential side of the embedding groove; and the magnetic actuating unit is fixed in the arc groove.

15. The ratchet tool as claimed in claim 12, wherein the head is connected with a power eccentric device, and the power eccentric device is capable of driving the head to swing.

* * * * *